United States Patent [19]

Hull

[11] Patent Number: 4,690,852

[45] Date of Patent: Sep. 1, 1987

[54] FOIL FOR STAINED GLASS ASSEMBLY

[75] Inventor: A. Katherine Hull, Grosse Pointe, Mich.

[73] Assignee: Paul Gach, St. Clair Shores, Mich.

[21] Appl. No.: 743,392

[22] Filed: Jun. 11, 1985

[51] Int. Cl.[4] .......................... B32B 3/00; B44C 5/08

[52] U.S. Cl. .......................... 428/156; 156/63; 156/209; 156/220; 156/553; 428/38; 428/40; 428/172; 428/187; 428/344; 428/906

[58] Field of Search .............. 29/469.5; 156/209, 220, 156/553, 63; 264/284; 428/38, 46, 49, 167, 172, 344, 40, 156, 187, 906

[56] References Cited

U.S. PATENT DOCUMENTS

| | | | |
|---|---|---|---|
| 2,830,001 | 4/1958 | Barnes et al. | 428/167 |
| 3,190,788 | 6/1965 | Loos | 428/344 |
| 3,902,942 | 9/1975 | Vecchiarelli | 156/209 |

*Primary Examiner*—William J. Van Balen
*Attorney, Agent, or Firm*—John H. Faro

[57] ABSTRACT

An improved foil for stained glass assembly is disclosed. This improved foil is unique in that it includes an indexing reference to assist in the precise placement of the foil on the edge of a piece of stained glass. After foiling of numerous pieces of stained glass, they are butted to one another and soldered together along their contiguous seams. The precise placement of the foil on the edge of the glass insures that the solder bead between such contiguous pieces is uniform, thus insuring an esthetically attractive and structurally superior article.

3 Claims, 5 Drawing Figures

FOIL FOR STAINED GLASS ASSEMBLY

BACKGROUND OF THE INVENTION

1. Field of the Invention

This invention relates to an article of manufacture, method and apparatus. More specifically, this invention concerns itself with a unique improved metallic foil for stained glass assembly, a method for use and manufacture of the foil and the device for performance of such method.

2. Description of the Prior Art

The purpose of this invention is to provide an improved technique for the alignment of a solder-supporting foil in relation to the edge of a piece of stained glass. As is well known in the art, failure to properly align the foil on the glass edge results in an uneven distribution of solder once the various glass pieces are butted to one another and ultimately assembled in the form of a finished article. The reason for this uneven distribution of solder can be directly attributed to the difficulty, and in some cases, the inability of the artisan to precisely align the foil so as to have an equal amount of overlap around the edge of each of the individual pieces which make up the stained glass object. Thus, when solder is ultimately applied to the abutted pieces of foiled glass, it simply follows the unevenness of the foil border of each of the pieces of the object.

OBJECTS OF THE INVENTION

It is the object of this invention to remedy the above as well as related deficiencies in the prior art.

More specifically, it is the principle object of this invention to provide an improved foil for use in stained glass assembly which includes a visible center-line reference or guide for precision placement of the foil relative to the edge of a piece of glass.

It is another object of this invention to provide an improved foil for use in stained glass assembly which includes graphic information and/or physical embossment of the foil as a center-line reference.

It is yet another object of this invention to provide an improved method for stained glass assembly and a device for modification of a foil to provide a center-line reference.

SUMMARY OF THE INVENTION

The above and related objects are achieved by providing a foil ribbon of a defined width and thickness having a pressure-sensitive adhesive coating on one surface thereof and a center-line reference running the length of such ribbon which is visible from the adhesive-coated side thereof. In one of the preferred embodiments of this invention the center-line reference is simply graphic information imprinted on the foil which is visible through the adhesive. Alternatively, the adhesive itself (if pigmented) could provide a graphic center-line reference or the center-line reference could be printed directly on the adhesive layer. In another of the preferred embodiments of this invention, the center-line reference is provided by embossment of the foil along its length.

DESCRIPTION OF THE INVENTION INCLUDING PREFERRED EMBODIMENTS

Figure 1:
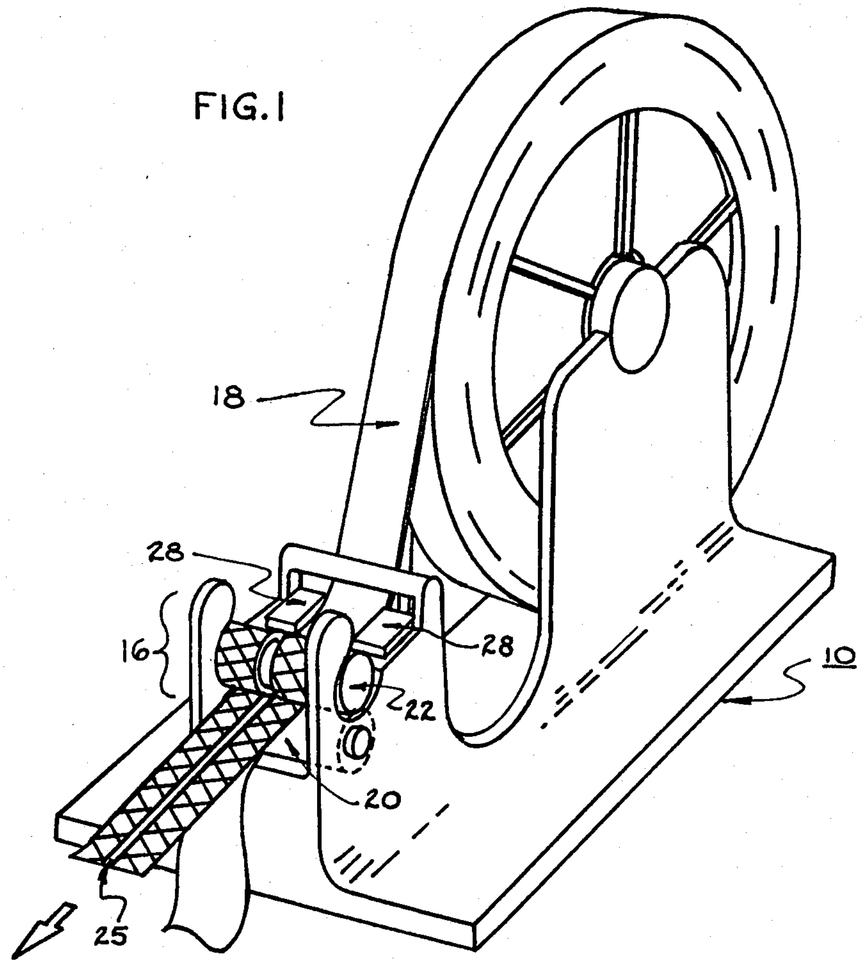
FIG. 1 is a perspective view of a device for imparting a center-line reference to a foil ribbon.
Figure 2:
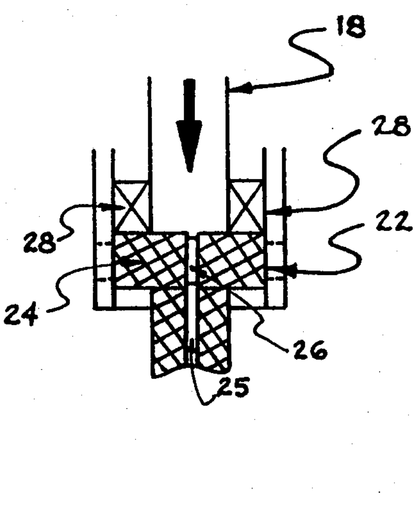
FIG. 2 is an enlarged cut-away view of the foil embossing station of the device of FIG. 1.

FIG. 1 is an illustration of a simple device which can be used to impart a center-line reference to a foil ribbon of the type used in stain glass assembly. This dispenser (10) includes a housing (12) for support of a roll of foil (14) and an embossing station (16) through which the foil (18) can be fed. The housing is similar in its construction to a cellophane tape dispenser. The embossing station of this housing, more fully illustrated in FIG. 2, comprises a resilient support roller (20) and a pressure (embossing) roller (22). The pressure roller (22) is provided, in part, with a textured surface (24). The unembossed surface of the foil can be located at the center line (25) in the embodiment illustrated in FIG. 2; or, in the alternative, at the periphery of the center line (not shown). In operation of the embossing device, the tape is positioned by a pair of spacers (28), (28') so as to align the center of the foil with the center-line (26) of the embossing roller (22). Once the center of the foil is aligned with the center-line of the embossing roller, it is drawn between the rollers. The pressure from the embossing roller selectively deforms the foil so as to provide a center-line reference (25) which is visible upon removal of the releasable paper backing therefrom. The dispensing device can further be provided with a cutting implement (not shown) to enable cutting of sections of foil from the roll subsequent to the embossing thereof.

Figure 3:
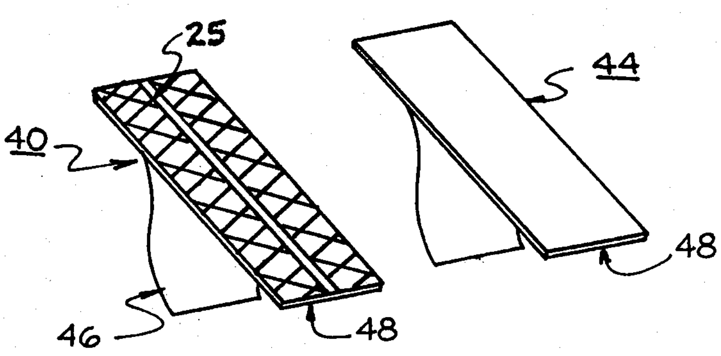
FIG. 3 is a perspective view of a section of an embossed foil ribbon and a section of ribbon lacking an embossed center-line reference.

FIG. 3 illustrates a section of embossed foil (40) and a section of foil (44) which is lacking a center-line reference. It is an essential feature of this invention that the center-line reference be visible to the artisan upon removal of the releasable paper backing (46) from the adhesive side of the foil (48). As is evident from the embossed foil of FIG. 3, the center-line reference (25) is essentially permanently embossed upon the foil ribbon (40) and thus can be manipulated by the artisan onto the edge of the glass without concern that the reference may be rubbed off or otherwise obliterated.

Figure 4:
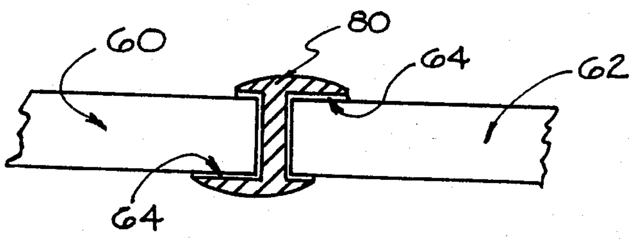
FIG. 4 is a cross-sectional view of two abutting pieces of glass which have been improperly foiled.

FIG. 4 is a cross-sectional view of two abutted pieces of glass (60), (62) which have been improperly foiled. As is evident, the overlap of the foil (64) on the respective edges of each piece of glass is non-uniform and thus will provide an uneven solder base once the artisan attempts to assemble the pieces together.

Figure 5:
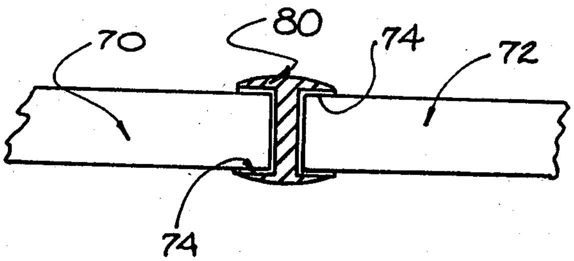
FIG. 5 is a cross-sectional view of two abutted pieces of glass which have been properly foiled.

By way of contrast, FIG. 5 illustrates two abutted pieces of glass (70), (72) which have been properly foiled. As is evident, the overlap of the foil (74) on each piece of glass is essentially uniform and thus when the artisan applies the solder (80) to the foil, it will uniformly flow in the seam between the glass and form a bead on the glass surface of uniform thickness. The unifority and the distribution of solder is essential both from the standpoint of appearance and for structural integrity.

While the invention has been described above in respect to the embossment of a center-line reference, such reference can be applied as graphic information at the time of manufacture, (e.g. prior to application of an adhesive coating to the underside of the ribbon). In practice, this would simply involve the printing of such reference on the underside of the foil ribbon prior to application of the adhesive coating. The adhesive coating must be sufficiently transparent to insure that the graphic center-line reference is visible through the adhesive. Alternatively, the adhesive itself (if pigmented) could provide a graphic center-line reference or the center-line reference could be printed directly on the adhesive layer.

In the preferred embodiments of this invention, the foil ribbon is essentially copper in nature; however, any solder-supporting (e.g. metallic) foil would be acceptable and is contemplated within the scope of this invention. As is further evident to one skilled in the art, modifications and improvements can be made to the specific embodiments illustrated hereinabove without departure from the spirit and scope of this invention. The foregoing description is thus not intended as delineating the scope of this invention which is set forth in the claims which follow.

What is claimed is:

1. A metallic foil ribbon for use in fabrication of panels and articles from stained glass, said ribbon comprising:

a solder supportive foil ribbon having an essentially uniform width, a coated surface and an uncoated surface, said coated surface having thereon a pressure-sensitive adhesive and said uncoated surface being provided with embossment essentially along its entire length so as to reference the center line of said ribbon along its length, said embossment being visible from the adhesive coated surface.

2. The metallic foil ribbon of claim 1, wherein the embossment of the ribbon is to the periphery of the center line along the length of the ribbon.

3. A metallic foil ribbon for use in fabrication of panels and articles from stained glass, said ribbon comprising:

a solder supportive foil ribbon having an essentially uniform width, a coated surface and an uncoated surface, said coated surface having thereon a pressure-sensitive adhesive and graphic information so as to reference the center line on said ribbon along its length, said graphic information being visible from the adhesive coated surface.

* * * * *